(12) United States Patent
Helm et al.

(10) Patent No.: US 8,880,058 B2
(45) Date of Patent: Nov. 4, 2014

(54) AUTOMATIC TUNING SYSTEM

(75) Inventors: Sean Lee Helm, Saline, MI (US); Eric Randell Schmidt, Northville, MI (US); Bryan Yamasaki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/618,061

(22) Filed: Sep. 14, 2012

(65) Prior Publication Data

US 2014/0080480 A1 Mar. 20, 2014

(51) Int. Cl.
*H04W 4/00* (2009.01)

(52) U.S. Cl.
USPC .................. 455/425; 455/426.1; 379/406.01

(58) Field of Classification Search
CPC . H04M 9/082; H04M 1/6091; H04M 1/6083; H04M 2250/02; H04M 1/6075
USPC ................................... 455/426.1, 425, 569.2; 379/406.01–406.12; 370/286; 704/275
See application file for complete search history.

(56) References Cited

U.S. PATENT DOCUMENTS

| | | | |
|---|---|---|---|
| 5,050,160 A | | 9/1991 | Fuda |
| 5,502,717 A | * | 3/1996 | Park ............................... 370/286 |
| 5,610,909 A | | 3/1997 | Shaw |
| 6,151,397 A | * | 11/2000 | Jackson et al. ................ 381/71.4 |
| 2002/0118822 A1 | * | 8/2002 | Ariyama ................... 379/406.01 |
| 2002/0142803 A1 | * | 10/2002 | Yamamoto ...................... 455/557 |
| 2005/0058278 A1 | * | 3/2005 | Gallego Hugas et al. ........................ 379/406.01 |
| 2005/0265560 A1 | * | 12/2005 | Haulick et al. ................... 381/58 |
| 2007/0037607 A1 | * | 2/2007 | Matsuda ..................... 455/569.2 |
| 2007/0116254 A1 | * | 5/2007 | Looney et al. ............ 379/406.01 |
| 2007/0280472 A1 | * | 12/2007 | Stokes, III et al. ........ 379/406.01 |
| 2008/0043931 A1 | * | 2/2008 | Steele et al. ................. 379/27.03 |
| 2009/0304177 A1 | * | 12/2009 | Burns et al. ................. 379/406.1 |
| 2009/0310796 A1 | * | 12/2009 | Seydoux ........................ 381/71.1 |
| 2010/0022282 A1 | * | 1/2010 | Piket et al. .................. 455/569.2 |
| 2011/0064232 A1 | * | 3/2011 | Ruwisch ......................... 381/59 |
| 2011/0194685 A1 | * | 8/2011 | van de Laar ............. 379/406.01 |
| 2012/0094657 A1 | * | 4/2012 | Gullapalli et al. ............. 455/425 |

* cited by examiner

*Primary Examiner* — Nathan Taylor
(74) *Attorney, Agent, or Firm* — Gifford, Krass, Sprinkle, Anderson & Citkowski, P.C.

(57) ABSTRACT

A system and method, automatically adaptable for use on multiple platforms, configured to reduce echoes heard by an end user of a remote communication device is provided. The system is configured to transmit communication from the remote communication device to a speaker, and to pick up communication from the microphone to the remote communication device. The system and method is directed towards emitting a test signal and processing the signal so as to calculate a phase shift to be applied to an outgoing auditory signal. The calculated phase shift is configured to cancel the test signal.

21 Claims, 5 Drawing Sheets

FIG. 4

AUTOMATIC TUNING SYSTEM

FIELD OF THE INVENTION

The invention relates to a system and method for reducing echoes heard by an end user of a remote communication device. More particularly the system and method is configured to emit a test signal, and process the signal so as to calculate a phase shift to be applied to an outgoing auditory signal received by the remote communication device.

BACKGROUND OF THE INVENTION

Systems configured to transmit audible signals, such as verbal communication, between a user and an end user utilize echo cancellation. Echo cancellation functions to prevent the end user of a remote cellular phone from hearing his/her own voice. For instance, without echo cancellation, the end user's verbal communication is transmitted to the cabin from a speaker, picked up by a microphone of a system, and transmitted back to the end user of the cellular phone.

Figure 1A:
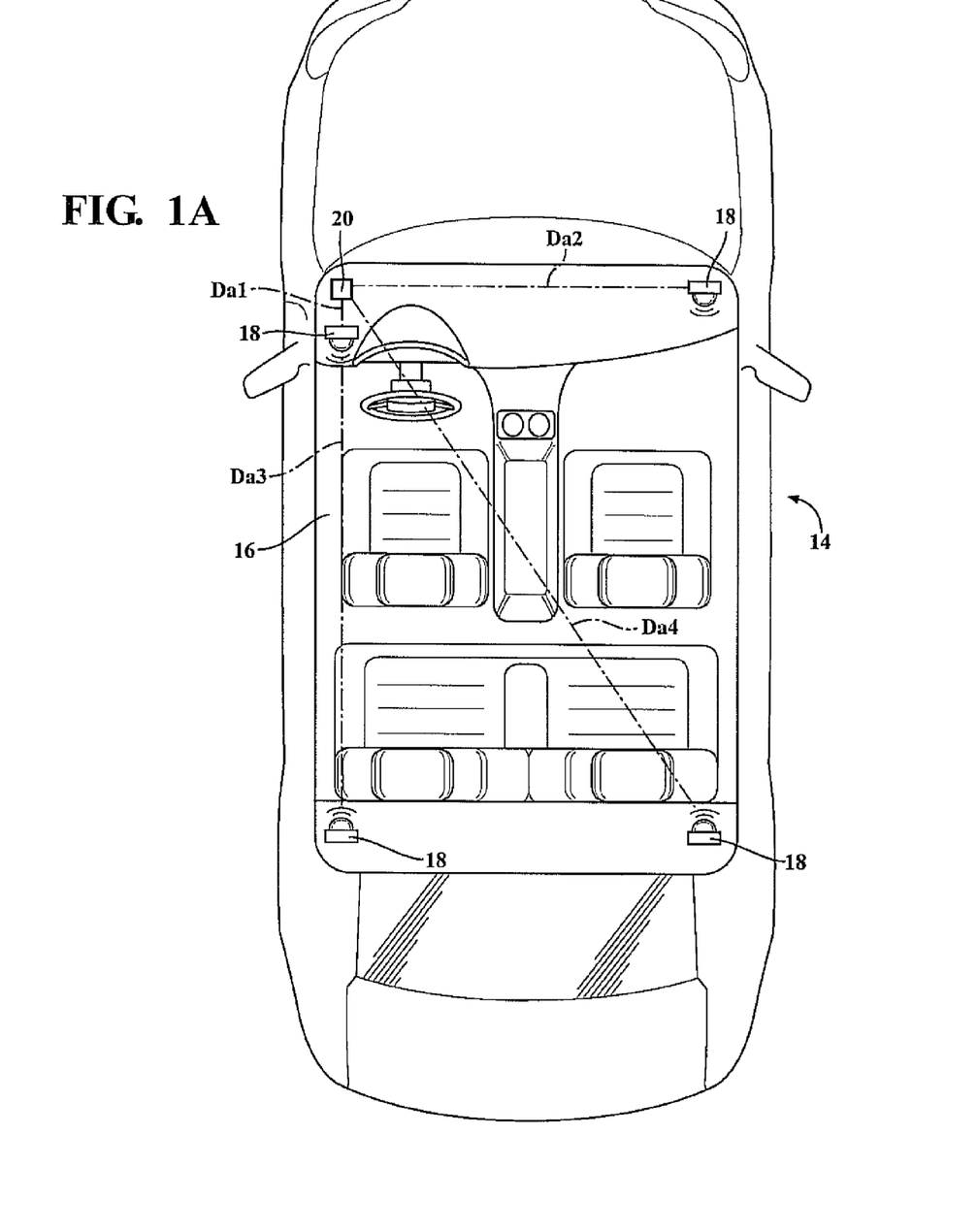
FIG. 1A is an exemplary view of an interior cabin space of a platform showing the speaker and microphone configuration.
Figure 1B:
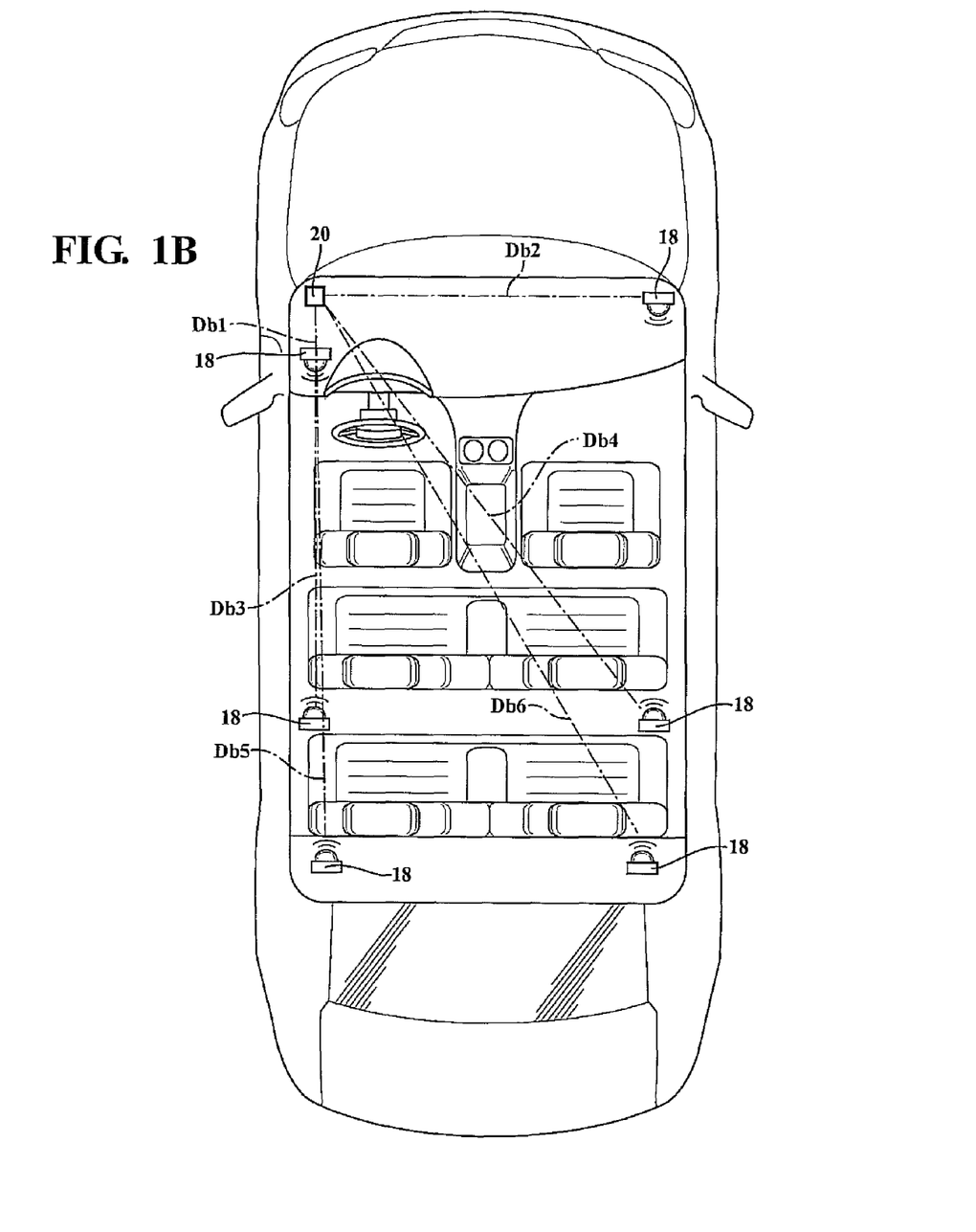
FIG. 1B is an exemplary view of an interior cabin space of a platform other than the platform shown in FIG. 1A, showing a different speaker and microphone configuration.

Referring to FIGS. 1A and 1B, a system is illustratively shown mounted to a platform. The platform includes at least one speaker and a microphone. The system is configured to transmit sounds through the speaker and process and transmit sounds picked up by the microphone to a remote communication device. For illustrative purposes, FIG. 1A shows the platform being an automotive vehicle having four speakers, one at each corner of the cabin space, and a microphone mounted adjacent to the driver-side A-pillar. As shown, each speaker is positioned away from the microphone at different distances, as indicated by Da1, Da2, Da3, and Da4 respectively.

With reference now to FIG. 1B, the platform is also illustrated as an automotive vehicle. The platform includes six speakers, and a microphone mounted adjacent to the driver-side A-pillar. Each speaker is positioned away from the microphone at different distances than the other, as indicated by Db1, Db2, Db3, Db4, Db5, and Db6, respectively.

The system includes a transceiver configured to receive and transmit a digital signal from and to an end user. The system further includes a processor unit in electrical communication with the transceiver. The processor unit is configured to process the digital signal from the transceiver into an auditory signal in analog form. The auditory signal is transmitted to the speakers and projected into the cabin space. The microphone is configured to receive auditory signals from within the cabin space. The auditory signal is then digitized and directed to the transceiver. The transceiver transmits the digitized signal to the remote communication device. Thus, the user of the remote communication device will hear an echo of his/her own voice.

Accordingly, it is known to apply a phase shift to the outgoing auditory signal which cancels or reduces the end user's verbal communication. Thus, the end user only hears the verbal communication from the user within the cabin space of the platform. The phase shift is programmed into the system and may be installed on a platform such as a vehicle.

However, a phase shift configured to cancel the echo is dependent upon factors such as the distance the speakers are in relation to the microphone, and the attenuation of the end user's auditory signal received by the processor unit. Accordingly, a system that is effective in cancelling echo in one platform, may not be effective in cancelling echo in a different platform. For instance, a phase shift configured to cancel an echo within the platform of FIG. 1A, may not be effective in the platform of FIG. 1B. Thus, it remains desirable to have a system which automatically tunes itself to cancel echoes so as to be adaptable for use across platforms of differing speaker configurations.

SUMMARY OF THE INVENTION AND ADVANTAGES

A system configured to reduce or cancel echoes in a remote communication device is provided. The system may be further configured to automatically tune itself to reduce or cancel echoes so as to be adaptable for use across multiple platforms.

The system is configured to transmit a signal from a remote communication device to a speaker, and transmit audio signals from a microphone to the remote communication device so as to facilitate two-way communication. The system includes a transceiver configured to receive and transmit a digital signal from and to a remote communication device. The transceiver is in electrical communication with a processor unit. The processor unit is configured to process a digital signal received from the transceiver into an auditory signal in the form of an analog signal. The analog signal is transmitted to the speaker. The speaker produces a sound which is picked up by the microphone and transmitted to the processor unit. The processor unit digitizes the sound and the transceiver transmits the digitized sound to the end user of the remote communication device.

The system includes a test signal generator configured to transmit a test signal in the form of a sound through the speaker. The test signal is transmitted through the speaker and received by the microphone. The microphone transmits the test signal to the processor unit. The processor unit is configured to detect the period of time from when the test signal was transmitted by the test signal generator and when the test signal was received by the microphone, also referenced herein as the "Delay."

The system further includes a phase shifter. The phase shifter is in electrical communication with the processor unit. The processor unit is further configured to process the Delay so as to calculate a phase shift configured to cancel the test signal. The calculated phase shift is transmitted to the phase shifter and the phase shifter is configured to apply the calculated phase shift to an outgoing signal transmitted by the transceiver. Thus, any outgoing signal is shifted so as to reduce or cancel an incoming auditory signal from a remote communication device. Preferably, the phase shift is configured to shift the test signal by 180 degrees. Accordingly, the system is configured to reduce or cancel an echo heard by an end user. Further, the system may be adaptable for use across numerous platforms regardless of the speaker and microphone configurations.

A method for automatically reducing echoes in a remote communication device is also provided herein. The method includes the step of providing a transceiver configured to receive and transmit a digital signal from and to a remote communication device. The transceiver transmits the digital signal from the end user communication device to a processor unit. The processor unit is configured to convert the digital signal to an analog signal. The processor unit then transmits the analog signal to a speaker. The speaker projects the analog signal into the cabin space of the platform.

The method includes the step of transmitting a test signal in the form of a sound through the speaker. The test signal is subsequently received by the microphone. The method proceeds to the step of detecting the period of time from when the test signal was transmitted and when the test signal was received by the microphone.

The method proceeds to the step of calculating a phase shift configured to cancel the test signal. The method proceeds to the step of applying the calculated phase shift to an outgoing signal transmitted by the transceiver. Accordingly, the signal received by a remote communication device is modified so that the audible communication transmitted by the remote communication device is cancelled or reduced from an outgoing signal received by the end user communication device.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a system 10 configured to reduce or cancel echoes in a remote communication device 12 is provided. The system 10 may be further configured to automatically tune itself to reduce or cancel echo so as to be adaptable for use across multiple platforms 14.

Figure 3:
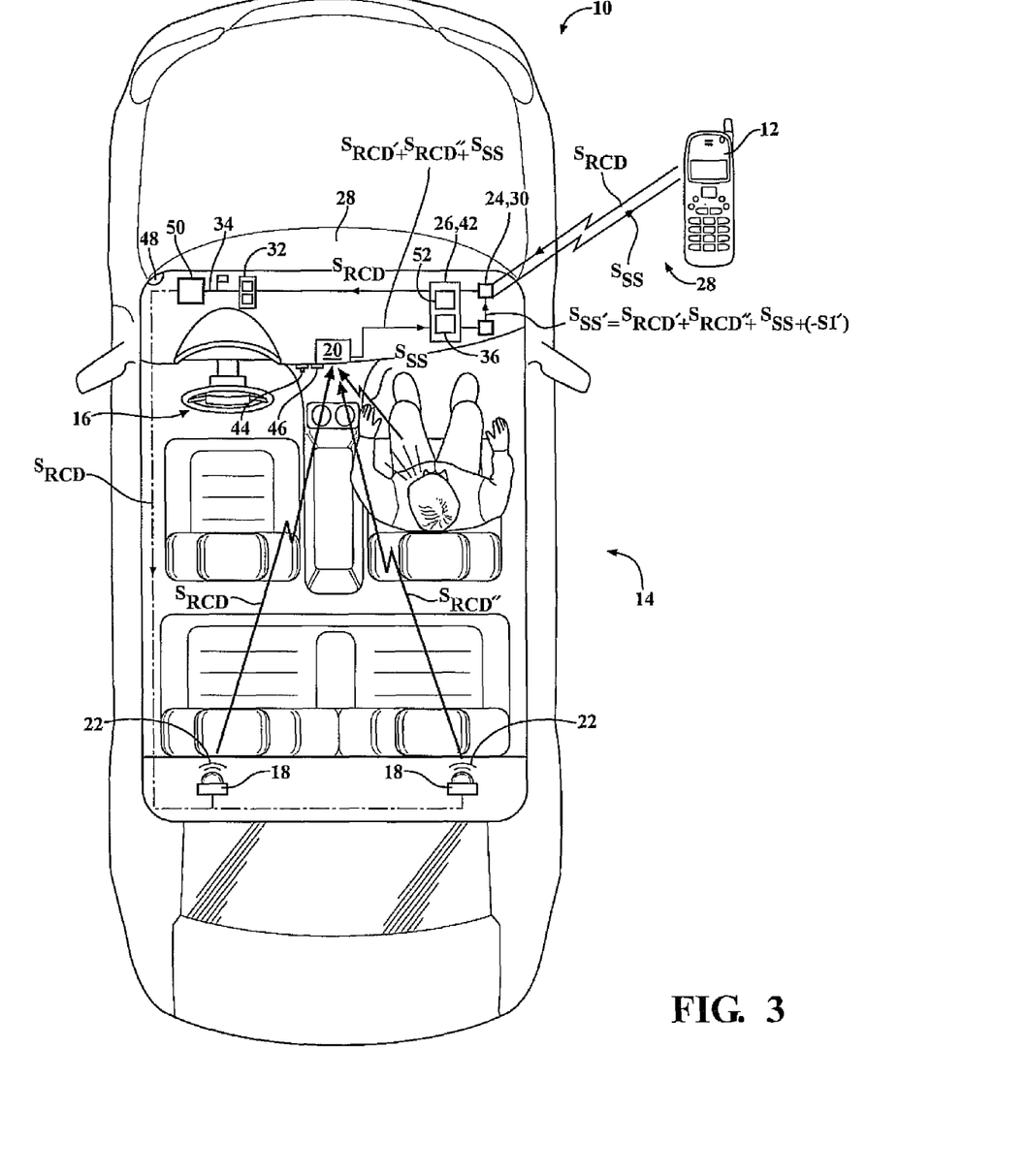
FIG. 3 is a diagram showing the auditory signals processed by the system and a remote communication device.

With reference first to FIG. 3, an illustrative embodiment of the system 10 is provided. The system 10 is configured to transmit sounds through a speaker 18, and to process and transmit sounds picked up by a microphone 20 to a remote communication device so as to facilitate two-way communication. The speakers 18 and microphone 20 are mounted to a platform 14 having a cabin space 16, such as an automotive vehicle. The speaker 18 is configured to project an auditory signal 22 into the cabin space 16, and the microphone 20 is configured to receive the auditory signal 22.

The system 10 includes a transceiver 24 and a processor unit 26. The transceiver 24 is configured to receive and transmit a digital signal 28, referenced specifically as $S_{RCD}$ and/or $S_{SS}$, respectively, from and to a remote communication device 12 operated by an end user. Any transceiver 24 currently known and used in the art may be adaptable for use herein, illustratively including a transceiver 24 commonly referenced as a Bluetooth module 30. The processor unit 26 is in electrical communication with the transceiver 24. The processor unit 26 is configured to process the digital signal 28 $S_{RCD}$ from the transceiver 24 into an auditory signal 22.

Figure 2:
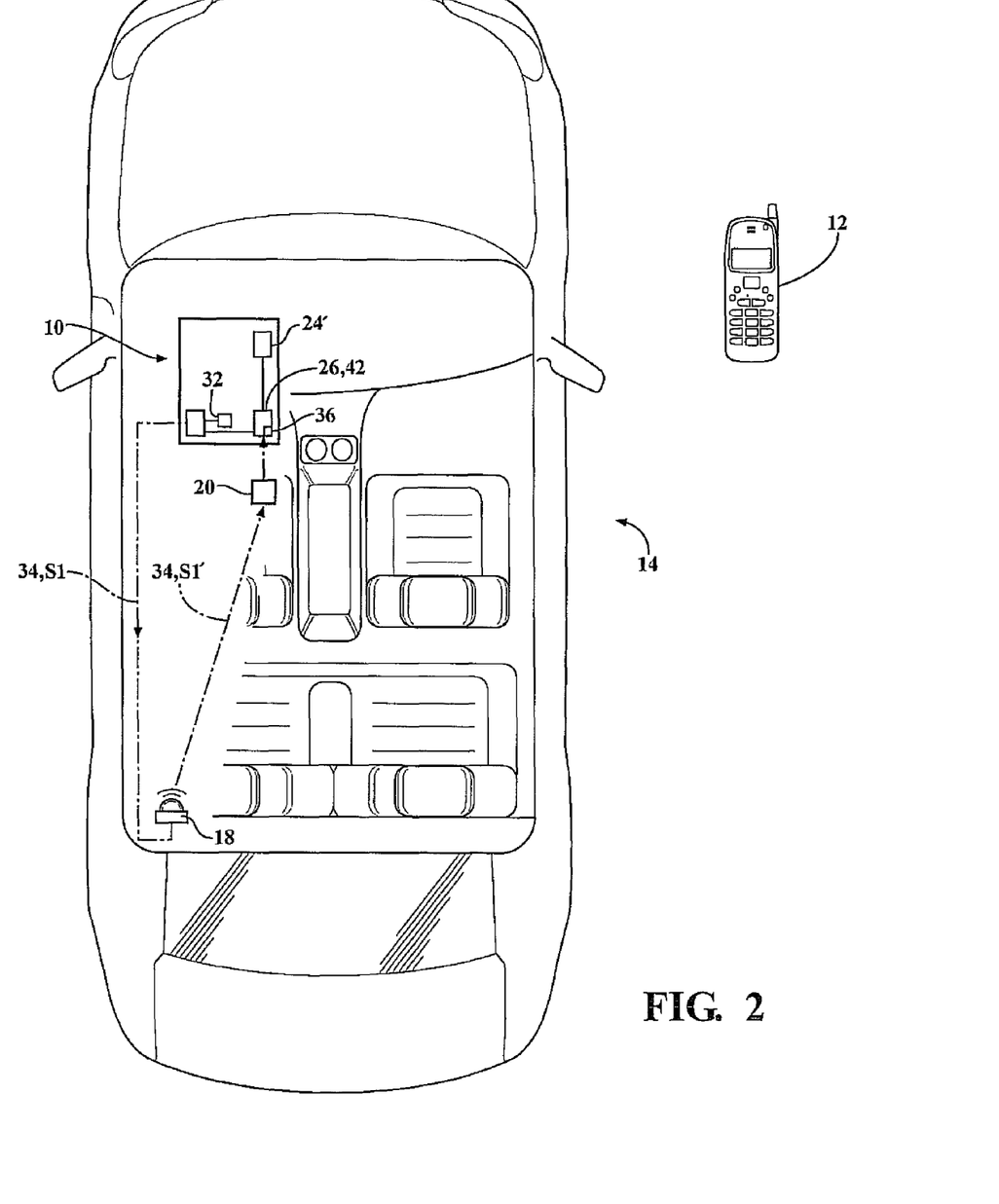
FIG. 2 is a diagram showing the test signal generated and processed by the system and a remote communication device.

With reference now to FIG. 2, the system 10 further includes a test signal generator 32. The test signal generator 32 is configured to transmit a test signal 34, also referenced herein as S1. The test signal generator 32 may be a standalone unit configured to transmit an auditory signal directly to the speakers 18, as shown in FIGS. 2 and 3. Alternatively, the test signal 34 may be generated in a digital form and transmitted to a processor unit 26 wherein the test signal 34 is converted into an analog signal. The analog signal is transmitted to the speaker 18 in the form of a sound, such as a beep. The sound may be in the human audible range. Preferably, the test signal 34 is configured to be picked up by the microphone 20. The test signal 34 is preferably transmitted in a short burst. The test signal 34 is transmitted through the speakers 18 and received by the microphone 20. The test signal 34 may be modified by attenuation, as referenced herein as S1'.

The processor unit 26 is in electrical communication with the microphone 20. The processor unit 26 may be further configured to detect the period of time from when the test signal 34 was transmitted and when the test signal 34 was received by the microphone 20. For instance, the processor unit 26 may be programmed with a timer initiated when the test signal 34 is transmitted, and stopped when the microphone 20 picks up the test signal 34. The microphone 20 receives audio transmissions from each of the speakers 18 within the cabin space 16 of the platform 14. As shown in FIGS. 1A and 1B, each speaker 18 may be positioned from the microphone 20 at different distances than the other. Thus, test signal 34 may be received by the microphone 20 at different times. Accordingly, the processor unit 26 may be configured to detect the period of time between the transmission of the test signal 34 and the receipt of the last transmission of the test signal 34 from a speaker 18. In most instances, the last transmission received by the microphone 20 is made by the speaker 18 the furthest distance from the microphone 20.

The system 10 further includes a phase shifter 36 in electrical communication with the processor unit 26. The processor unit 26 is further configured to calculate a phase shift configured to cancel the test signal 34. The calculated phase shift 38, also referenced herein as "−S1", is transmitted to the phase shifter 36. The phase shifter 36 applies the calculated phase shift 38 to subsequent outgoing auditory signals 40 transmitted by the transceiver 24 so as to reduce an echo heard by an end user operating a remote communication device 12. Preferably, the processor unit 26 calculates a phase shift configured to invert the test signal 34. For instance, the calculated phase shift applies a 180 degree phase shift to a signal received by the microphone 20. It should be appreciated that the modified signal has an amplitude approximately the same as the incoming signal, but is offset 180 degrees so as to cancel the incoming signal from an outgoing signal.

The system 10 may be installed on a platform 14 having a cabin space 16, such as an automotive vehicle. Upon actuation of the system 10, the test signal generator 32 generates a test signal 34 that is transmitted through the speakers 18. It should be appreciated that the system 10 may include multiple speakers 18 as shown in FIGS. 1A and 1B. The test signal S1' is picked up by the microphone 20. The processor unit 26 determines the period of time beginning from when the test signal S1 was generated and when the test signal S1' was received by the microphone 20, referenced herein as the "Delay." The processor unit 26 processes the Delay, and calculates a phase shift configured to cancel the test signal 34, or reduce the profile of the test signal 34 to a desired tolerance. The calculated phase shift 38 is applied to subsequent auditory signals 22 received from the microphone 20.

In operation, an audible communication in digitized form (referenced as $S_{RCD}$) from an end user operating a remote communication device 12 is transmitted to the transceiver 24. The transceiver 24 transmits the digital signal 28 $S_{RCD}$ to the processor unit 26. The digital signal 28 $S_{RCD}'$ is converted to analog form and transmitted to the speaker(s) 18 as $S_{RCD}'$. The digital signal 28 $S_{RCD}'$ is picked up by the microphone 20, along with any audio communication ($S_{SS}$) from a user within the cabin space 16 of the platform 14.

Accordingly, the microphone 20 receives both audible communications $S_{RCD}'$, $S_{RCD}''$ (as the case may be) and $S_{SS}$. The processor unit 26 applies the calculated phase shift 38 to $S_{RCD}'$, $S_{RCD}''$, and $S_{SS}$, wherein $S_{RCD}'$, $S_{RCD}''$ are cancelled so as to form signal $S_{SS}'$. $S_{SS}'$ is a signal having the profile of $S_{SS}$ along with any residual profile of $S_{RCD}'$, $S_{RCD}''$ after having −S1' applied. $S_{SS}'$ is transmitted to the transceiver 24, and subsequently to the remote communication device 12 in a digital form. Accordingly, the system 10 reduces echoes heard by the end user operating the remote communication device 12.

The phase shifter 36 may be integrated into the processor unit 26. For instance, the processor unit 26 may include firmware and hardware configured to apply the calculated phase shift 38 a digital signal 28. Any such processor unit 26 currently known and used in the art may be adaptable for use herein, illustratively including a digital signal processor 42. Thus, through programming and hardware, the digitized signal may be modified by application of the calculated phase shift 38. The modified digitized signal S2' is transmitted to the remote communication device 12, via the transceiver 24, wherein a processor of the remote communication device 12 is configured to convert modified digitized signal S2' into analog form.

The system 10 may be further configured to tune itself upon command, or automatically upon the experience of a state. For instance, the system 10 may include an input 44 configured to actuate the processor unit 26 so as to erase the calculated phase shift 38 and actuate the signal generator so as to calculate a new calculated phase shift. The input 44 may be mounted to an exposed surface within the cabin space 16 of the platform 14. Alternatively, the processor unit 26 may be able to automatically erase the calculated phase shift 38 and actuate the signal generator so as to calculate a new phase shift, when the system 10 experiences a predetermined state, such as the engine has driven ten thousand miles.

The system 10 may further be configured to tune itself upon command by a user. For instance, the system 10 may include a tuner 46. The tuner 46 is operable to adjust the calculated phase shift 38. The tuner 46 is in communication with the processor unit 26 and is configured to modulate the calculated phase shift 38 so as to manually adjust the calculated phase shift 38. For instance, the user of the remote communication device 12 may notify the user of the system 10 that he/she is experiencing an echo or otherwise receiving a poor audible communication. The user of the system 10 may actuate the tuner 46, so as to modify the calculated phase shift 38 in an effort to manually improve the audible communication heard by the end user of the remote communication device 12. For use herein, modification of the calculated phase shift 38 includes an increase or decrease in amplitude or frequency of the calculated phase shift 38, or the offset of the cycle of the calculated phase shift 38. The tuner 46 may be a dial configured to adjust the phase shift by a predetermined tolerance such as +/−a half radian.

The state may be influenced by other environmental factors which affect the speed of sound, such as humidity or temperature. For instance, the processor unit 26 may be in electrical communication with a first sensor 48. The first sensor 48 is operable to detect an environmental state of the cabin space 16. For example, the first sensor 48 may be a thermostat configured to detect the temperature of the cabin space 16. The first sensor 48 transmits the temperature to the processor unit 26 so as to actuate the processor unit 26 to automatically erase the calculated phase shift 38 and actuate the test signal generator 32 so as to calculate a new phase shift when the temperature within the cabin space 16 of the platform 14 is over a predetermined temperature. For instance, the first sensor 48 may actuate the processor unit 26 to automatically erase the calculated phase shift 38 and actuate the test signal generator 32 so as to calculate a new phase shift when the temperature within the cabin space 16 of the platform 14 is over 100 degrees Fahrenheit. Alternatively, the processor may be in electrical communication with a first sensor 48 configured to detect humidity within the cabin, and operable to automatically erase the calculated phase shift 38 and actuate the signal generator so as to calculate a new phase shift when the humidity within the cabin space 16 of the platform 14 is over a predetermined humidity.

The system 10 may further include an amplifier 50 configured to amplify audible signal S1. The amplifier 50 may cause attenuation of the analog audio signal emitted from the speakers 18, as indicated by $S_{RCD}'$, and $S_{RCD}''$. Attenuation may be detected by a comparison of the audible signal S1 with the S1'. For instance, the processor unit 26 may be configured to record the incoming signal S1 and signal S1', and programmed to compare the two.

The detected attenuation of the test signal 34 (S1') is transmitted to the processor unit 26. The processor unit 26 may be further configured to process both the attenuation of the test signal 34 (S1'), and the period of time from when the test signal 34 was transmitted and when the test signal 34 was received by the microphone 20 to calculate a phase shift. The calculated phase shift 38 is configured to cancel the test signal 34. The calculated phase shift 38 is transmitted to the phase shifter 36 and the processor unit 26 is configured to apply the calculated phase shift 38 to an outgoing auditory signal 40 transmitted by the transceiver 24. The processor unit 26, transceiver 24, test signal generator 32, and phase shifter 36 may be packaged as a single unit. For instance, the processor unit 26, transceiver 24, test signal generator 32, and phase shifter 36 may be formed onto a circuit board or within the housing of a multimedia device commonly known as a head unit.

Figure 4:
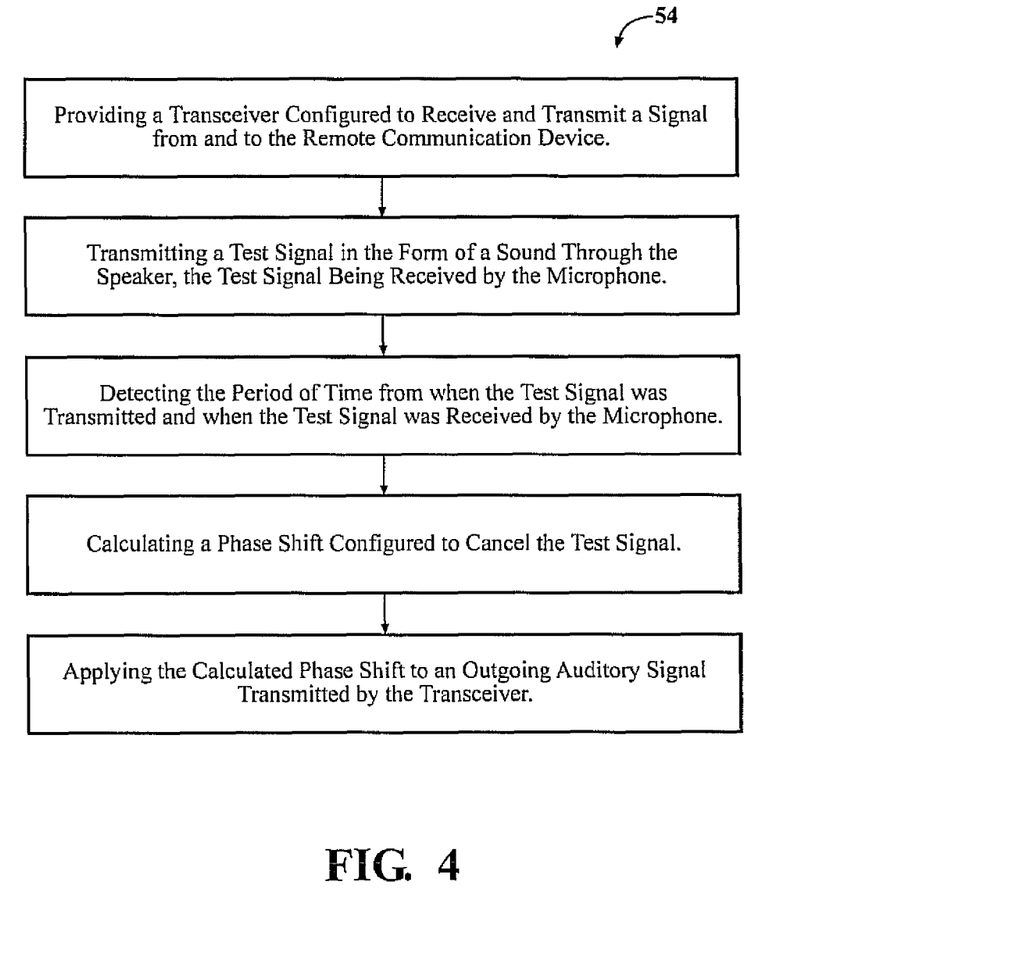
FIG. 4 is a diagram showing the steps for a method of automatically reducing echoes in a remote communication device.

A method 54 for reducing echoes in a remote communication device 12 in communication with a system 10 configured to transmit sounds through the speaker(s) 18 and process and transmit sounds picked up by the microphone 20 to the remote communication device 12 is also provided. The method 54 may be directed towards automatically or manually reducing echoes heard by the end user of the remote communication device 12. The system 10 may be installed into a platform 14 having a speaker 18 and a microphone 20. An audible signal from the speaker 18 is received by the microphone 20 and transmitted to the remote communication device 12 in digital form.

The method 54 includes the step of providing a transceiver 24 configured to receive and transmit a digital signal 28 from and to the remote communication device 12. Any transceiver 24 currently known and used in the art may be adaptable for use herein, illustratively including a transceiver 24 commonly referenced as a Bluetooth module 30. The transceiver 24 receives a digital signal 28 carrying an audible communication from the remote communication device 12. The digital signal 28 is converted to an analog signal and transmitted through the speakers 18.

The transceiver 24 is further configured to receive an auditory signal 22 from a microphone 20. The microphone 20 picks up the audio communication in an analog form and transmits the analog signal to a processor unit 26. The processor unit 26 converts the analog signal into a digital form. The digital signal 28 is transmitted from the transceiver 24 to the remote communication device 12. Any transceiver 24 currently known and used in the art may be adaptable for use herein, illustratively including a Bluetooth module 30.

The method 54 includes the step of transmitting a test signal 34. The test signal 34 may be generated by a test signal generator 32. The test signal 34 may be provided in a digital form and converted into an analog signal and transmitted to the speaker 18 in the form of a sound, such as a beep. The sound may be in the human audible range. The test signal 34 is subsequently received by the microphone 20.

The test signal 34 is generated with a predetermined amplitude and frequency which may be picked up by the microphone 20. The test signal 34 is preferably transmitted in a short burst. The test signal 34 is transmitted through the speakers 18 and received by the microphone 20.

The method 54 proceeds to the step of detecting the period of time from when the test signal 34 was transmitted and when the test signal 34 was received by the microphone 20. The period of time may be detected by a processor unit 26 configured to detect the period of time from when the test signal 34 was transmitted and when the test signal 34 was received by the microphone 20. The method 54 proceeds to the step of calculating a phase shift configured to cancel the test signal 34. The processor unit 26 may be further configured to process the detected period of time to calculate the phase shift operable to cancel the test signal 34.

The method 54 proceeds to the step of applying the calculated phase shift 38 to an outgoing digital signal 28 transmitted by the transceiver 24. The modified outgoing digital signal 28 is transmitted by the transceiver 24 to the remote communication device 12, wherein application of the calculated phase shift 38 cancels the echo heard by the end user of the remote communication device 12. Preferably, the processor unit 26 calculates a phase shift of 180 degrees so as to invert the test signal 34. Thus, the auditory signal 22 from the end user device is cancelled or reduced from an outgoing auditory signal 40 transmitted by the receiver and received by the end user communication device.

The method 54 may include the step of providing a phase shifter 36. The phase shifter 36 is configured to apply the calculated phase shift 38 to an outgoing auditory signal 40 transmitted by the transceiver 24. The phase shifter 36 applies the calculated phase shift 38, also referenced as (−S1') to the digitized signal received from the microphone 20, so as to produce a modified signal. The processor unit 26 may be a digital signal processor 42 configured to apply the calculated phase shift 38 to $S_{RCD}'$, $S_{RCD}''$, and $S_{SS}$, wherein $S_{RCD}'$, $S_{RCD}''$ are cancelled so as to form signal $S_{SS}'$. Signal $S_{SS}'$ is the modified signal having the profile of $S_{SS}$ along with any residual profile of $S_{RCD}'$, $S_{RCD}''$ after having −S1' applied. $S_{SS}'$ is transmitted to the transceiver 24, and subsequently to the remote communication device 12 in a digital form.

The phase shifter 36 may be incorporated into the processor unit 26 through the use of hardware and firmware. Any such processor unit 26 currently known and used in the art may be adaptable for use herein, illustratively including a digital signal processor 42. The digital signal processor 42 configured to convert an analogue auditory signal 22 into a digital form, and through the execution of code modify the digital form to include the calculated phase shift 38. Thus, through programming and hardware, the digitized signal may be modified by application of the phase shift.

The method 54 may further include the step of detecting a predetermined state, and calculating a new phase shift upon detecting the predetermined state. For instance, the processor unit 26 may be able to automatically erase the calculated phase shift 38 and actuate the signal generator so as to calculate a new phase shift, when the system 10 experiences a predetermined state, such as the engine has driven ten thousand miles.

The method 54 may include the step of providing a first sensor 48 operable to detect an environmental state of the cabin space 16. For example, the first sensor 48 may be a thermostat configured to detect the temperature of the cabin space 16. The first sensor 48 transmits the temperature to the processor unit 26 so as to actuate the processor unit 26 to automatically erase the calculated phase shift 38 and actuate the signal generator so as to calculate a new phase shift when the temperature within the cabin space 16 of the platform 14 is over 100 degrees Fahrenheit. Alternatively, the processor may be in electrical communication with a first sensor 48 configured to detect humidity within the cabin, and operable to automatically erase the calculated phase shift 38 and actuate the signal generator so as to calculate a new phase shift when the humidity within the cabin space 16 of the platform 14 is over a predetermined humidity.

The method 54 may further include the step of providing an input 44 configured to actuate the processor unit 26 so as to erase the calculated phase shift 38 and actuate the signal generator so as to calculate a new phase shift. For instance, the input 44 may be a button mounted to the platform 14.

The method 54 may further include the step of detecting an attenuation of the test signal 34. The attenuation may be detected by a second sensor 52, or by a comparison of the test signal S1 transmitted by the test signal generator 32 and signal S1' transmitted by the speaker 18 and received by microphone 20. Test signal S1' is transmitted to the processor unit 26, wherein S1 and S1' are compared and processed to calculate and attenuation.

The method 54 may further include the step of processing both the attenuation of signal S1 and the Delay to calculate a phase shift. The calculated phase shift 38 is configured to cancel the test signal 34, S1'. The calculated phase shift 38 is applied to subsequent audible transmissions of the speakers 18 that are picked up by the microphone 20 to be transmitted to the remote communication device 12 via the transceiver 24.

The method 54 may further include the step of manually tuning the calculated phase shift 38. A tuner 46 may be provided. The tuner 46 is configured to manually adjust the calculated phase shift 38. The tuner 46 is in communication with the processor unit 26 and is configured to modulate the calculated phase shift 38 so as to manually adjust the calculated phase shift 38. For instance, the user of the remote communication device 12 may notify the user of the system 10 that he/she is experiencing an echo or otherwise receiving a poor audible communication.

Obviously, many modifications and variations of the present invention are possible in light of the above teachings and may be practiced otherwise than as specifically described while within the scope of the appended claims.

What is claimed is:

1. A system for use in an automotive vehicle having a cabin space, the automotive vehicle having a speaker and a microphone disposed within the cabin space, the system electrically coupled to the speaker and microphone and in wireless communication with a communication device disposed external to the cabin space, the system configured to reduce or cancel echoes transmitted to the remote communication device, the system comprising:

a transceiver having an integrated test signal generator, the transceiver configured to receive and transmit an auditory signal from and to the remote communication device, the test signal generator configured to transmit a test signal in the form of a sound through the speaker, the test signal having a known amplitude and frequency, wherein the test is different than the auditory signal, wherein the test signal is received by the microphone;

a tuner disposed within the cabin space; and a processor unit configured to detect the period of time from when the test signal was transmitted and when the test signal was received by the microphone, the processor unit having a phase shifter in electrical communication with the processor unit, the processor unit further configured to calculate a phase shift configured to cancel the test signal, the phase shifter receiving the calculated phase shift and applying the calculated phase shift to an outgoing auditory signal transmitted by the transceiver so as to cancel an echo transmitted to the remote communication device; the tuner configured to manually adjust the calculated phase shift so as to adjust the outgoing auditory signal received by the remote communication device.

2. The system as set forth in claim 1, wherein the transceiver is a Bluetooth module.

3. The system as set forth in claim 1, wherein the processor unit includes a digital signal processor unit configured to convert an analog auditory signal into a digital form.

4. The system as set forth in claim 1, wherein the processor unit is further configured to erase the calculated phase shift, and further configured to actuate the signal generator so as to calculate a new phase shift.

5. The system as set forth in claim 1, further including a second sensor operable to detect an attenuation of the test signal.

6. The system as set forth in claim 5, wherein the processor unit processes both the attenuation of the test signal and the period of time from when the test signal was transmitted and when the test signal was received by the microphone to calculate a phase shift, the phase shift configured to cancel the test signal, the phase shifter receiving the calculated phase shift and applying the calculated phase shift to an outgoing auditory signal transmitted by the transceiver.

7. The system as set forth in claim 1, wherein the processor unit calculates a phase shift configured to invert the test signal.

8. The system as set forth in claim 1, wherein the calculated phase shift is configured to shift the outgoing signal by 180 degrees of the test signal.

9. A method for automatically reducing echoes in a system, the system for use in a platform having a cabin space, the platform having a speaker and a microphone, the system in wireless communication with a remote communication device, the remote communication device located remotely from the platform, the method comprising the steps of:

providing a transceiver configured to receive and transmit a signal from and to the remote communication device;

emitting a test signal through the transceiver, the test signal being a recorded sound and emitted through the speaker, the test signal being received by the microphone;

detecting the period of time from when the test signal was transmitted and when the test signal was received by the microphone;

calculating a phase shift configured to cancel the test signal;

applying the calculated phase shift to an outgoing auditory signal transmitted by the transceiver; and manually adjusting the calculated phase shift so as to provide a desired sound quality to the remote communication device.

10. The method as set forth in claim 9, wherein the transceiver is a Bluetooth module.

11. The method as set forth in claim 9, further including the step of providing a test signal generator configured to generate the test signal.

12. The method as set forth in claim 9, further including the step of providing a processor unit configured to detect the period of time from when the test signal was transmitted and when the test signal was received by the microphone.

13. The method as set forth in claim 12, wherein the processor unit includes a digital signal processor unit configured to convert an analog auditory signal into a digital form.

14. The method as set forth in claim 12, wherein the processor unit is further configured to erase the calculated phase shift, and further configured to actuate the signal generator so as to calculate a new phase shift.

15. The method as set forth in claim 14, further including the step of detecting a predetermined state, and actuating the processor unit to erase the calculated phase shift, actuate the signal generator, and calculate a new phase shift upon detecting the predetermined state.

16. The method as set forth in claim 14, further including the step of providing an input configured to actuate the processor unit to erase the calculated phase shift, actuate the signal generator, and calculate a new phase shift upon actuation of the input.

17. The method as set forth in claim 9, further including the step of detecting an attenuation of the test signal.

18. The method as set forth in claim 17, wherein the processor unit processes both the attenuation of the test signal and the period of time from when the test signal was transmitted and when the test signal was received by the microphone to calculate a phase shift, the phase shift configured to cancel the test signal, and a phase shifter receiving the calculated phase shift and applying the calculated phase shift to an outgoing auditory signal transmitted by the transceiver.

19. The method as set forth in claim 9, wherein the processor unit calculates a phase shift configured to invert the test signal.

20. The method as set forth in claim 9, wherein the calculated phase shift is configured to shift the outgoing signal by 180 degrees of the test signal.

21. The method as set forth in claim 9, further including the step of providing a tuner, the tuner configured to manually adjust the calculated phase shift.

* * * * *